United States Patent
Tsou et al.

(10) Patent No.: US 8,993,681 B2
(45) Date of Patent: Mar. 31, 2015

(54) DENDRITIC ETHYLENE POLYMERS AND PROCESSES FOR MAKING

(75) Inventors: Andy H. Tsou, Allentown, PA (US); Shuji Luo, Bridgewater, NJ (US); Donna J. Crowther, Seabrook, TX (US); Gabor Kiss, Hampton, NJ (US); Johannes M. Soulages, Morristown, NJ (US); Pradeep P. Shirodkar, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 721 days.

(21) Appl. No.: 13/182,868

(22) Filed: Jul. 14, 2011

(65) Prior Publication Data
US 2013/0018120 A1   Jan. 17, 2013

(51) Int. Cl.
| | | |
|---|---|---|
| *C08F 279/02* | (2006.01) | |
| *C08F 36/20* | (2006.01) | |
| *C08L 45/00* | (2006.01) | |
| *C08J 3/24* | (2006.01) | |
| *C08F 255/06* | (2006.01) | |
| *C08F 8/02* | (2006.01) | |

(52) U.S. Cl.
CPC . *C08F 36/20* (2013.01); *C08J 3/24* (2013.01); *C08F 255/06* (2013.01); *C08F 8/02* (2013.01)
USPC .............................. 525/324; 525/240; 525/319

(58) Field of Classification Search
CPC .......... C08F 255/06; C08F 36/20; C08F 8/02; C08F 3/24
USPC ......... 525/191, 192, 240, 242, 244, 263, 324; 526/336
See application file for complete search history.

(56) References Cited

U.S. PATENT DOCUMENTS

| | | |
|---|---|---|
| 3,592,881 A | 7/1971 | Ostapchenko |
| 5,635,262 A | 6/1997 | Best et al. |
| 6,084,030 A | 7/2000 | Janssen et al. |
| 6,087,447 A | 7/2000 | Stevens et al. |
| 6,325,956 B2 | 12/2001 | Chaudhary et al. |
| 6,429,260 B1 | 8/2002 | Plaver et al. |
| 7,582,716 B2 | 9/2009 | Liang et al. |
| 7,842,770 B2 | 11/2010 | Liang et al. |
| 2011/0118420 A1* | 5/2011 | Lohse et al. .................. 525/338 |

FOREIGN PATENT DOCUMENTS

| | | |
|---|---|---|
| GB | 2038845 | 7/1980 |
| WO | 0027615 | 5/2000 |
| WO | 0069930 | 11/2000 |
| WO | 2009001473 | 12/2008 |

OTHER PUBLICATIONS

Patil, R. et al. Macromolecules vol. 38 (2005) pp. 10571-10579.*
Josef Coufal, Jiri Valasek; "Films from blends of polyolefins with thermoplastic elastomers," Plasty a Kaucuk (1982), 19(12), 359-64 (Abstract).
P. Micic, S. N. Bhattacharya, G. Field, "Transiety Elongational Viscosity of LLDPE/LDPE Blends and Its Relevance to Bubble Stability in the Film Blowing Process," Polymer Engineering and Science, Oct. 1998, vol. 38, No. 10, pp. 1685-1693.
A. Ajji, P. Sammut, M. A. Huneault, "Elongational Rheology of LLDPE/LDPE Blends," Journal of Applied Polymer Science, vol. 88, (2003), pp. 3070-3077.

\* cited by examiner

*Primary Examiner* — Irina S Zemel
*Assistant Examiner* — Jeffrey Lenihan
(74) *Attorney, Agent, or Firm* — Robert A. Migliorini

(57) ABSTRACT

Provided is a dendritic ethylene polymer. The polymer is a dendritic polymer of an ethylene/alpha-olefin-diene copolymer and a vinyl-terminated polyethylene. There is also provided a process for making a dendritic ethylene polymer. The process includes the steps of preparing a dendritic ethylene polymer by reacting ethylene/alpha-olefin-diene copolymer with vinyl-terminated polyethylene in the presence of a radical source. There is also provided a blend and a blown film that include the dendritic ethylene polymer.

13 Claims, 1 Drawing Sheet

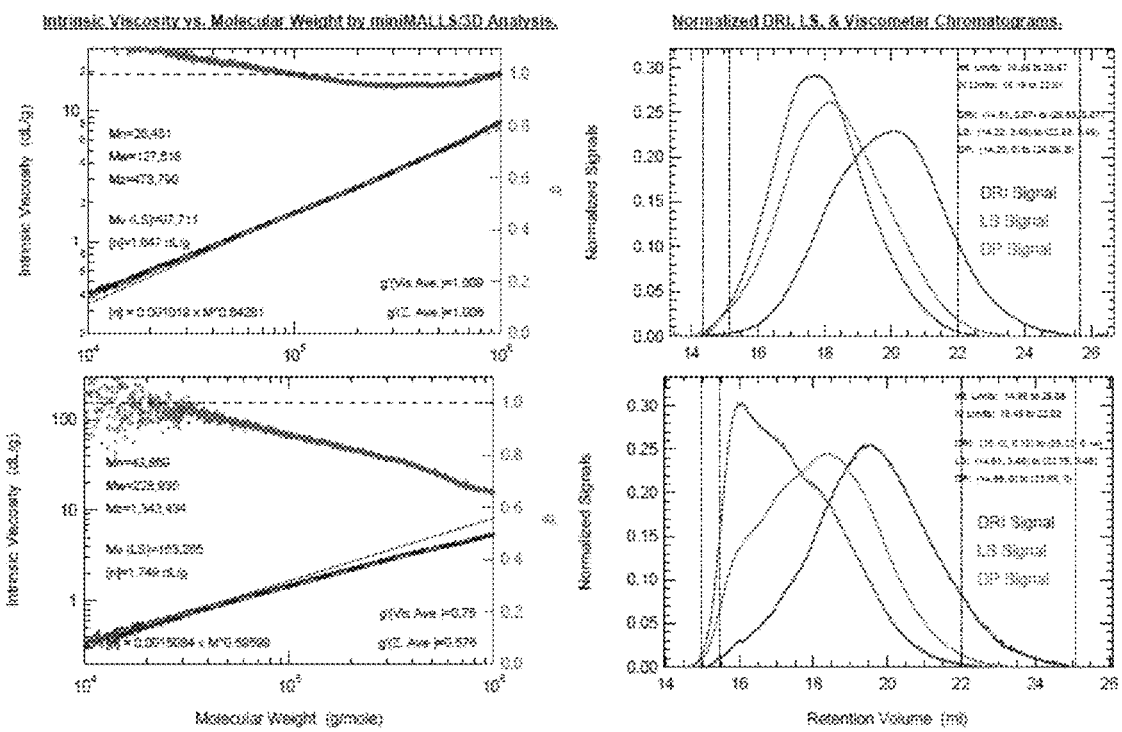

DENDRITIC ETHYLENE POLYMERS AND PROCESSES FOR MAKING

FIELD

The present disclosure relates to a dendritic ethylene polymer. The present disclosure further relates to a process for making a dendritic ethylene polymer. The present disclosure further relates to a blend containing the dendritic ethylene polymer.

BACKGROUND

LDPE (low density polyethylene) exhibits excellent blown film processability but relatively low stiffness and impact toughness. LDPE was made using peroxide initiated radical polymerization of ethylene and contains both short and long chain branches. The excellent processability of LDPE is believed to be due to the presence of long-chain branch structures or dendritic structures, although such structures have not been characterized analytically.

HDPE (high density polyethylene) has purely linear PE chains without any long and short chain branches. HDPE exhibits excellent stiffness but poor mechanical toughness and blown film processability.

LLDPE (linear low density polyethylene) contains only short chain branches introduced through the addition of a linear alpha-olefin co-monomer. LLDPE has a heterogeneous composition distribution and exhibits good toughness and moderate stiffness but relatively low blown film processability.

mLLDPE (metallocene catalyst polymerized linear low density polyethylene) has a homogeneous composition distribution containing only short chain branches. mLLDPE exhibits excellent impact toughness and moderate stiffness but very poor blown film processability.

One method of determining blown film processability of PE resins is through the measurement of extension hardening using an extensional rheometer. See Polym. Eng. Sci., 38 (1998), 1685-1693, which is incorporated herein by reference. LDPE can be extensionally hardened, whereas HDPE, LLDPE, and mLLDPE do not extensionally harden except for a few grades of modified mLLDPE that show weak strain hardening. Presently, in order to maximize the blown film line speed for better film quality and for cost reduction, it is a common practice to add 10 or more % of LDPE to LLDPE or mLLDPE to improve extensional hardening and blown film processability. See J. Appl. Polym. Sci., 88(2003), 3070-3077), which is incorporated herein by reference. However, the addition of LDPE to LLDPE or mLLDPE significantly diminishes their impact toughness and mechanical stiffness.

It would be desirable to have an additive for ethylene polymers that would enhance extensional hardness and blown-film processability. It would also be desirable to have an additive that allows blown-film production rates to be increased. It would also be desirable to have an additive that does not significantly diminish impact toughness and mechanical stiffness of ethylene polymers.

SUMMARY

According to the present disclosure, there is provided a dendritic ethylene polymer (dEP). The dendritic ethylene polymer is a polymer of an ethylene/alpha-olefin-diene copolymer and a vinyl-terminated polyethylene.

Further according to the present disclosure, there is provided a process for making a dendritic ethylene polymer. The process has the step of reacting an ethylene/alpha-olefin-diene copolymer with a vinyl-terminated polyethylene in the presence of a radical source.

Further according to the present disclosure, there is provided a blend of a matrix ethylene polymer and 0.1 wt % to 10 wt % of the dendritic ethylene polymer described above based on the total weight of the blend.

DESCRIPTION OF THE FIGURE

FIG. 1 is a collection of plots relating to 3-D gel permeation chromatography (GPC) of EODC-g-VPE for the physical blend without DICUP in Example 10 and the reactive blend with DICUP in Example 9.

DETAILED DESCRIPTION

All numerical values within the detailed description and the claims herein are modified by "about" or "approximately" the indicated value, and take into account experimental error and variations that would be expected by a person having ordinary skill in the art.

Dendritic ethylene polymers of 2nd generation or higher (dEPs) are produced by solution or solid-state synthesis by reacting ethylene-alpha olefin-diene copolymers (EODC) with vinyl-terminated polyethylene (vPE) in the presence of a radical source, such as a peroxide.

An example of a representative reaction sequence is the following:

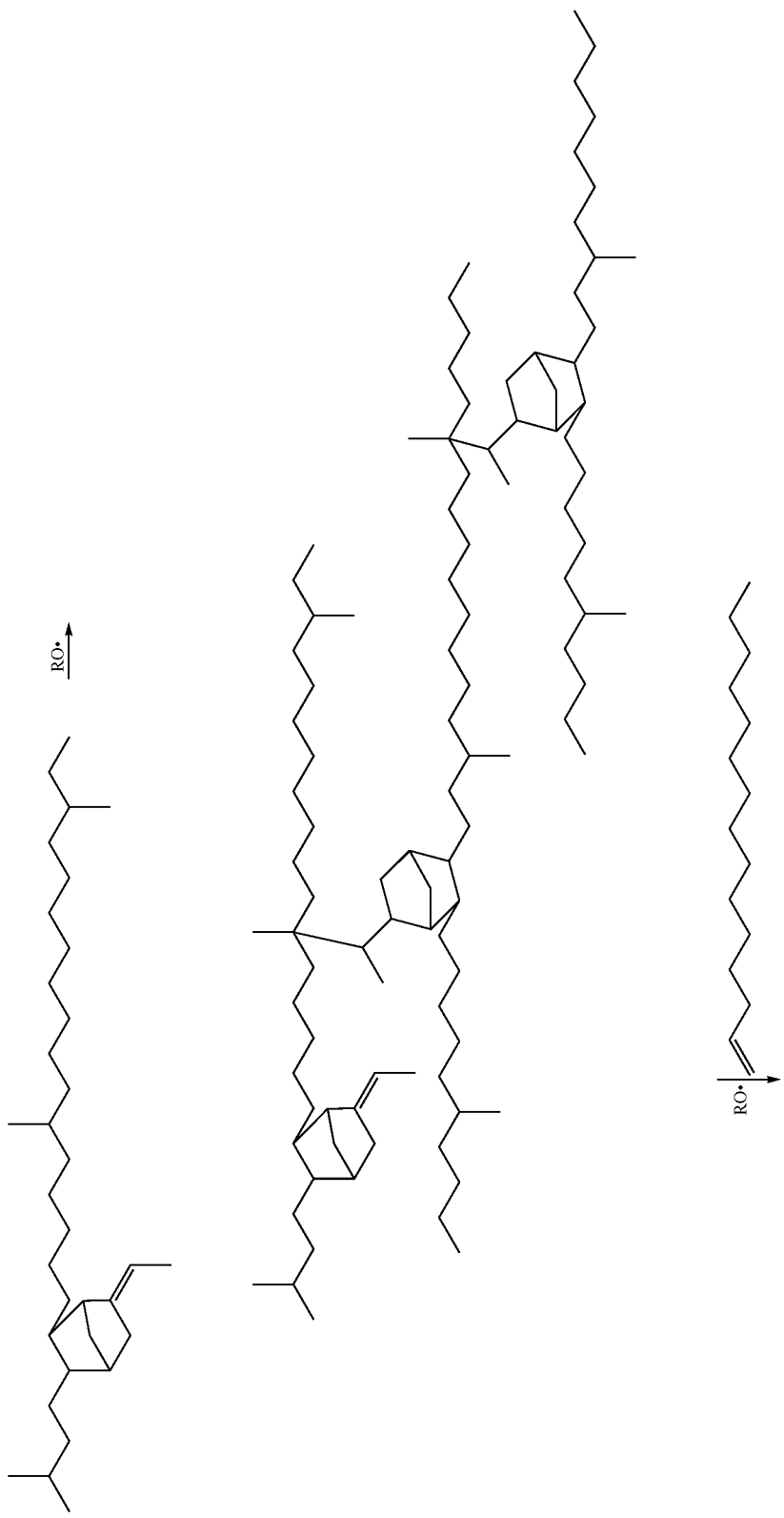

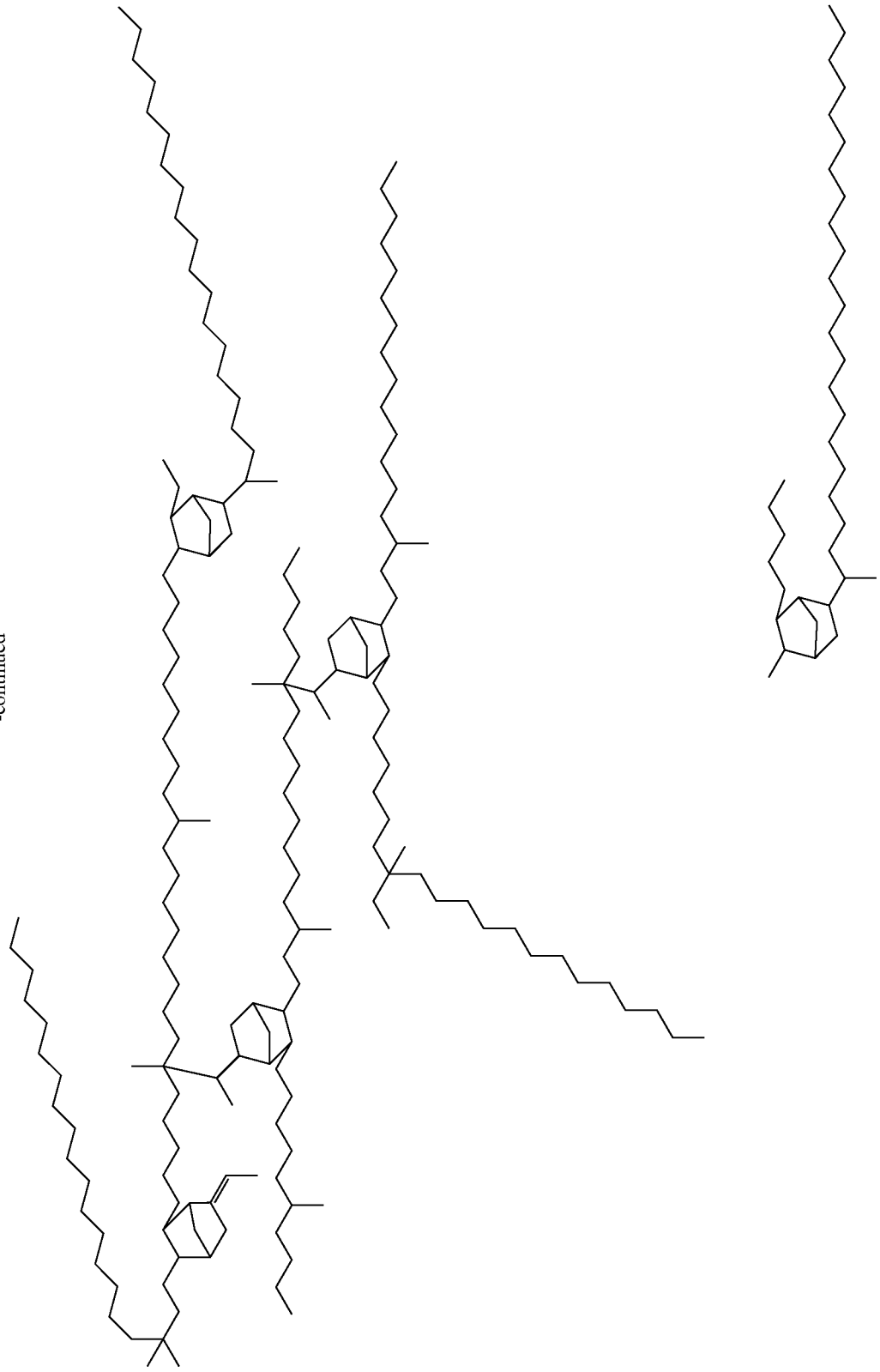

The addition of dEPs of the present disclosure to conventional polyethylenes (PEs) improves extensional hardening for better blown-film processability without substantially diminishing or compromising mechanical performance, optical clarity, and shear viscosity of the PEs. In one embodiment of the current disclosure, the dEPs are blended in at concentrations of up to 5 wt % with conventional PEs, such as, for example, linear low density polyethylene (LLDPE).

The dEPs can be prepared by a solid-state reactive extrusion synthesis process or a solution synthesis process.

The solid-state reactive extrusion mixing method of synthesizing the dEP is advantageous in that it does not require a solvent(s), a precipitation step(s), a separation step(s), a recovery step(s), or a purification step(s). Thus, it is substantially more cost effective than methods requiring solvents. Further, with a proper design of coupled extruders, it is possible to have an embodiment of a simple integrated process in which a first extruder is employed to prepare the dEP, which is then fed into a second extruder for extrusion blending with one or more PEs.

The dEPs can be made by reacting ethylene-alpha olefin-diene copolymers (EODC) with vinyl-terminated polyethylene (vPE) in the presence of a radical source, such as a peroxide. The EODC component is required to build the second or higher generation dendritic core (see, for example, the reaction sequence above).

Advantageously the EODC has an ethylene content of 45 mole % to 99 mole %, more preferably 50 mole % to 98 mole %, and most preferably 55 mole % to 97 mole % based on the total molar content of the EODC. The alpha olefin can be any organic compound having a vinyl end group. The alpha olefin component in EODCs is typically propylene, butene-1, hexene-1, octene-1, or decene-1, or dodecene-1, but other alpha olefins, for example, styrene, can be also used. Advantageously, the alpha olefin component of the useful EODCs is propylene.

The diene content in the EODC is typically 5 mole % or less and more typically 3 mole % or less. Advantageously, the diene content is 2 mole % or less. Any dienes, for example, divinyl benzene, 1,7-octadiene, 1-9 decadiene, and isoprene, can be used. Advantageously, the diene is ethylidene norbornene (ENB) or vinyl norbornene (VNB). Advantageously, the monomer distribution in the EODC component is random but can also have block content. The EODC may be substantially linear or contain long chain branching (LCB). The weight average molecular weight (Mw) of the EODC is typically from 5,000 to 900,000, more typically from 7,500 to 750,000, and most typically from 10,000 to 500,000 g/g·mol. Many types of EODCs, among them commercial EPDMs (ethylene-propylene diene elastomers) with either VNB or ENB diene co-monomer with moderate weight-average molecular weights, i.e., 50,000 to 500,000, are useful in the production of dendritic ethylene polymers.

The vinyl-terminated polyethylene (vPE) is needed to complete the final star generation as shown by way of example above. Typically, it has greater than 80% vinyl chain ends, or greater than 85% vinyl chain ends, and advantageously greater than 90% vinyl chain ends. The Mw of the vPE component is typically 1,000 to 500,000, more typically 2,000 to 450,000, and most typically 3,000 to 400,000. Preferably, the vPE is essentially linear with a branching index close to 1.0, e.g., greater than 0.7, more preferably greater than 0.8, and most preferably greater than 0.9. vPEs can be produced by various methods, including organo-metallic catalyzed coordination polymerization. Commercial HDPEs made with chrome catalysts that have >90% vinyl termination can also be utilized. Use of some fluorine catalysts yield vPEs having high proportions of vinyl chain ends with low polydispersity. Pyridylbisimido iron catalyst under certain reactor conditions also yields linear vPEs having high proportions of vinyl chain ends.

In order to minimize gelation or crosslinking of the ethylene-alpha olefin-diene copolymer, the molar ratio of vPE to EODC (vPE:EODC) advantageously is 2:1 to 150:1, more advantageously 3:1 to 100:1, and most advantageously 5:1 to 50:1. The peroxide or other free radical source used needs to have 1-hour half-life temperature greater than 70° C. In other words, the free radical source needs to be stable enough to require higher than 70° C. to have a 1-hour half-life. Examples of peroxide or other free radical sources that have 1-hour half life temperature greater than 70° C. include dicumyl peroxide (137° C.), di-tert-butyl peroxide (149.1° C.), 2,2'-azobis(isobutyronitrile) (81.6° C.). Both alkyl and aromatic peroxides can be used with dicumyl peroxide being most advantageous. The peroxide loading is advantageously 0.001 wt % to 5 wt % of the final weight, more advantageously 0.005 wt % to 2.5 wt %, and most advantageously 0.01 wt % to 1 wt %. Typically, sequential addition into the solution or reactive mixer with EODC being added first along with ½ of the total peroxide loading followed by vPE and the rest of the peroxide is advantageous. It is also advantageous to add the rest of the peroxide gradually to minimize any potential gel formation from vPE. The resulting dEP advantageously has as low gel content as possible, e.g., less than 80 wt %, more advantageously less than 70 wt %, and most advantageously less than 60 wt %.

For solution synthesis of the dEPs, hydrocarbon or halogenated solvents with boiling points higher than the decomposition temperature of the peroxide initiator (e.g. 150° C. if using dicumyl peroxide), are advantageous. Examples of solvents include decalin, di- and trichlorobenzene and polyalpha olefins. The solvent needs to be in sufficient amount to be able to fully dissolve the polymers. The reaction time for the development of dEP in solution is typically from 2 hours to 24 hours. The polymer product can be precipitated out from methanol. The solution process generally has the steps of dissolution, peroxide addition, reaction, polymer precipitation, solvent recovery, polymer drying, polymer finishing and pelletization.

For the solid state reaction, either a batch internal mixer or a continuous twin screw extrusion mixer can be used. The reactive extrusion mixing temperature is typically 160° C. to 220° C. and more advantageously 170 to 200° C. Due to the much higher concentrations of polymers than those in the solution process, the reaction time in the solid state reaction can be much shorter. The total mixing time (or the residence time for a continuous mixer) is typically 0.5 to 10 minutes and advantageously 1 to 7 minutes.

Either a batch internal mixer or a continuous twin screw extrusion mixer can be used to blend the resulting dEP with PE at typical dEP concentrations of 10 wt % or less, or 8 wt % or less, and advantageously 5 wt % or less. The blending (mixing) temperature can be between 170° C. to 200° C. with a residence time between 15 seconds to 5 minutes. The blended product can be either underwater pelletized or strand pelletized after extrusion mixing to deliver the final product. At 1 wt % dEP addition, the dEP additive can provide an extension hardening ratio of 1.3 or more at 150° C. with a LLDPE base polymer that itself has no extensional hardening (i.e., has an extension hardening ratio of 1).

There is also a blend of a matrix ethylene polymer and a dendritic ethylene polymer according to the present disclosure. The blend preferably has up to 10 wt %, more preferably up to 5 wt %, and most preferably 0.1 wt % to 5 wt % of the dendritic ethylene polymer based on the total weight of the blend. The amount of dendritic ethylene polymer is preferably sufficient to increase the extensional hardness and blown-film processability compared to the matrix ethylene polymer alone. The extensional hardness and processability is preferably increased without substantially diminishing or compromising mechanical performance, optical clarity, and shear viscosity. The matrix ethylene polymer is preferably selected from LDPE, HDPE, LLDPE, metallocene catalyst polymerized LLDPE (mLLDPE), VLDPE and combinations thereof, although other ethylene polymers are useful as well. Blends of the dendritic ethylene polymer and LLDPE or mLLDPE are particularly useful.

The dendritic ethylene polymer is particularly useful in film applications, particularly blown film applications. Accordingly, there is a film, and, more particularly, a blown film of the blend according to the present disclosure. Still more particularly, there is a blown film of a blend of the dendritic ethylene polymer and either of LLDPE and mLLDPE. The blown film can be formed by any known process, such as melt extrusion through a mandrel followed by expansion and orientation/hardening with a gas bubble. Other useful methods for forming films include cast extrusion and cast tentering. The addition of the dendritic ethylene polymer increases the extensional hardness and processability of the base or matrix polymer and preferably does so without substantially diminishing or compromising mechanical performance, optical clarity, and shear viscosity. Improved extensional hardening enhances blown film bubble stability and affords higher production rates and line speeds for blown film and reduces or eliminates the need for addition of processability additives to the matrix polymer.

The following are examples of the present disclosure and are not to be construed as limiting.

EXAMPLES

Preparation of EODC

Both commercial and lab-synthesized EPDM samples were used as the EOCD component. EODC1 was a commercial Vistalon 1703 (ExxonMobil Chemical) with 76.8 wt % ethylene, 0.9 wt % VNB, and the balance propylene, with 25 ML (Mooney viscosity). EODC2 was a lab synthesized EPDM for which the polymerization was carried out in a continuous stirred tank reactor (CSTR) made by Autoclave Engineers, Erie, Pa., at 2170 psig (150 bar) and 109° C. The EODC2 synthesis was performed using dimethyl(α-di(p-triethylsilylphenyl)-methylene)(3,8-di-tert-butylfluorenylindenyl)hafnium catalyst precursor F3 has a carbon bridge (MW 943.8 g/mol) activated by dimethylanilinium-tetrakis-(perfluorophenyl)borate (Mw=802 g/mol). The feed to the reactor contained 84.4 wt % solvent (hexane and small amount of toluene from the catalyst feed), 7.9 wt % propylene, 7.2 wt % ethylene, and 0.5 wt % ethylidene norbornene (ENB). The monomer conversions were 65%, 80%, and 29%, respectively. The residence time was 9.7 minutes (min). The terpolymer product contained 51.9 wt % ethylene, 1.3 wt % ENB, and balance propylene. The weight average molecular weight (Mw) was 226 kg/mol as determined by gel-permeation chromatography using a light scattering detector (GPC-LS).

Preparation of vPE

Both commercial and lab synthesized vPE were utilized. vPE1 is a commercial Paxon AL55033 HDPE (ExxonMobil Chemical) with 96% of vinyl chain ends. The weight average molecular weight (Mw) was 118 kg/mol as determined by gel-permeation chromatography using a light scattering detector (GPC-LS). vPE2 was synthesized in a 300 mL stainless steel autoclave reactor using the organometallic catalyst shown below. The catalyst solution was prepared by first mixing the iron complex with 10 equivalents methyl-aluminoxane (in toluene), stirring for 10 min, and then adding 1.05 equivalents trityl tetrakis(perfluorophenyl) borate. The mixture was stirred for 5 min and then transferred to the autoclave reactor. Polymerization was conducted at 80° C. for 2 hours (hrs) after the reactor was pressurized with 200 psig ethylene. The polymer was precipitated out of methanol, filtered and dried under vacuum at 75° C. overnight. vPE2 has 100% vinyl chain end and its number average molecular weight is 5,000 g/mol.

The organometallic catalyst used to synthesize VPE2 has the following structure:

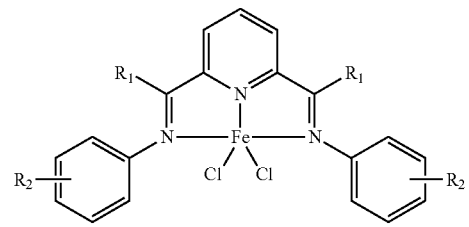

Solution Synthesis of EODC-g-vPE (Example 1)

To a 250 mL round-bottomed flask fitted with a nitrogen inlet, EODC1 (0.54 g) and vPE2 (2.58 g) were mixed with 1,2,4-trichlorobenzene (100 mL) under a nitrogen atmosphere. The mixture was heated to 150° C. with stirring, forming a homogeneous solution. Dicumyl peroxide (20 mg, mmol) was added. The reaction was let go for 16 hrs at 155° C. and then cooled down and quenched by methanol. The polymer was precipitated out of methanol and dried under vacuum at 80° C. overnight.

Solid State Synthesis of EODC-g-vPE (Examples 2-9)

EODC2 (0.501 g) was blended with DICUP (commercial dicumyl peroxide, 5.1 mg) using a DSM twin-screw miniature extrusion mixer running at 165-185° C., 55 RPM, for 0.5 minute; and then with vPE1 or vPE2 (2.5103 g) and DICUP (9 mg) for 3 minutes. The blend products (Examples 6-9) were submitted for GPC-3D analysis and the results were compared with that of the non-reactive blend (Example 10). The measured g' was reduced from 1 to 0.75 with the reactive blending indicating formation of long chain branches (from PE grafting).

TABLE 1

(Synthesis of EODC-g-vPE)

| Example | vPE:EODC (wt) | Reaction conditions | Estimated product gel (%) | g' |
|---|---|---|---|---|
| | | EODC1 + vPE2 | | |
| 1 | 4.8 | Solution phase, 155° C. for 16 hrs | 36.5 | 0.87 |
| 2 | 4.8 | 165° C. for 3 min | 35.5 | 0.729 |
| 3 | 4.8 | 180° C. for 3 min | 45 | 0.739 |

TABLE 1-continued (Synthesis of EODC-g-vPE)

| Example | vPE:EODC (wt) | Reaction conditions | Estimated product gel (%) | g' |
|---|---|---|---|---|
| 4 | 10.9 | 165° C. for 3 min | 29.3 | 0.787 |
| 5 | 10.9 | 165° C. for 3 min | 26.3 | 0.813 |
| | | EODC2 + vPE2 | | |
| 6 | 4.9 | (1) EPDM + DICUP 165° C. for 0.5 min; | 44.2 | 0.766 |
| | | (2) +PE + DICUP for 3 min | | |
| 7 | 5 | (1) EPDM + DICUP 180° C. for 0.5 min; | 48 | 0.777 |
| | | (2) +PE + DICUP for 3 min | | |
| | | EODC2 + vPE1 | | |
| 8 | 5 | (1) EPDM + DICUP 185° C. for 0.5 min; | 81.4 | 0.813 |
| | | (2) +PE + DICUP for 3 min | | |
| 9 | 5 | (1) EPDM + DICUP 185° C. for 0.5 min; | 58.2 | 0.75 |
| | | (2) +PE + DICUP for 3 min | | |
| 10 | 5 | Non-reactive blend 185° C. for 3 min | 6.5 | 1.009 |

Blending and Testing

Example 9 was blended with Exceed 1018 (mLLDPE, ExxonMobil Chemical) at 1-4.7 wt % using a DSM twin-screw miniature extrusion mixer running at 180-185° C., 50 RPM, and for 3 minutes. 0.1 wt % of BHT stabilizer was added in each batch. As listed in Table 1, B1 blend sample is the control Exceed that was sent through the extrusion mixer without EODC-g-vPE for 3 minutes along with 0.1 wt % BHT stabilizer. All blends were compression molded at 190° C. for 10 minutes to prepare testing plaques. An SER2 (Sentmanat Extensional Rheometer 2) attachment on an ARES rheometer was used to measure the extensional strain hardening of these plaques at 150° C. No strain hardening could be found in B1 whereas strain hardening could be found in blend samples containing Examples 8 and 9. Results are set forth in Table 2.

TABLE 2

(Extensional Strain Hardening)

| Sample | Description | Strain hardening |
|---|---|---|
| B1 | Exceed | 1 |
| B2 | Exceed + 1% Example 8 | 1.2 |
| B3 | Exceed + 1% Example 9 | 1.8 |
| B4 | Exceed + 2% Example 9 | 1.9 |
| B5 | Exceed + 2.3% Example 9 | 1.7 |
| B6 | Exceed + 4.7% Example 9 | 2.4 |
| B4 | LDPE | 5 |

The plots in FIG. 1 were obtained from high temperature GPC-3D.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A dendritic ethylene copolymer comprising the reaction product of an EPDM and a vinyl-terminated polyethylene, wherein the reaction results in formation of carbon-carbon bonds between the EPDM and the vinyl-terminated polyethylene.

2. A process for making a dendritic ethylene copolymer, comprising: reacting an EPDM with vinyl-terminated polyethylene in the presence of a radical source, wherein the reaction results in formation of carbon-carbon bonds between the EPDM and the vinyl-terminated polyethylene.

3. The process of claim 2, wherein the radical source is a peroxide.

4. The process of claim 3, wherein the peroxide is selected from the alkyl or aromatic peroxides that have 1-hour half life temperature greater than 70° C.

5. The process of claim 4, wherein the peroxide is dicumyl peroxide.

6. The process of claim 2, wherein the process is carried out in solution.

7. The process of claim 6, wherein the solution includes a high boiling solvent selected from decalin, dichlorobenzene, trichlorobenzene, polyalpha olefins and combinations thereof.

8. The process of claim 2, wherein the process is carried out in solid state.

9. A polymer blend comprising a matrix ethylene polymer and 0.1 wt % to 10 wt % of the dendritic ethylene copolymer of claim 1 based on the total weight of the blend.

10. The blend of claim 9, wherein the dendritic ethylene polymer is present at 0.1 wt % to 5 wt % based on the total weight of the blend.

11. The blend of claim 9, wherein the matrix ethylene polymer is selected from LDPE, HDPE, LLDPE, metallocene catalyst polymerized LLDPE, VLDPE, and combinations thereof.

12. The blend of claim 11, wherein the matrix ethylene polymer is selected from LLDPE and metallocene catalyst polymerized LLDPE.

13. The blend of claim 9, wherein the blend takes the form of a blown film.

* * * * *